Patented Nov. 17, 1936

2,061,249

UNITED STATES PATENT OFFICE 2,061,249

PROCESS OF HALOGENATING N-DIHYDRO-1:2:2':1'-ANTHRAQUINONE AZINES

Ferdinand W. Peck, Penns Grove, N. J., and Raymond J. Sobatzki, Carrollville, Wis., assignors to E. I. du Pont de Nemours and Company, Wilmington, Del., a corporation of Delaware No Drawing. Application January 16, 1933, Serial No. 652,098

7 Claims. (Cl. 260—31)

This invention relates to halogenated derivatives of the indanthrone series, more particularly chloro derivatives of N-dihydro-1:2:2':1'-anthaquinone azine, and a process for the manufacture thereof.

It is known that N-dihydro-1:2:2':1'-anthraquinone azine which has the formula

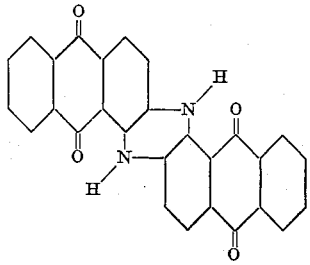

may be converted into chloro derivatives or substitution products by chlorination in an organic liquid or in sulfuric acid solution by means of chlorine gas at atmospheric pressure or at pressures greater than atmospheric. It has been found that the chloro derivatives prepared in sulfuric acid solution by means of chlorine gas (either at atmospheric pressure or at pressures greater than atmospheric) are inferior in the qualities of brilliancy, shade and tinctorial strength to similar products prepared by chlorination in organic liquids, such as, for example, nitro-benzene or ortho-dichloro-benzene, unless the acid-chlorinated product be submitted to a further purification.

It is an object of the present invention to produce halogenated compounds of the indanthrone series. A further and more specific object is to produce chlorinated N-dihydro-1:2:2':1'-anthraquinone azines. Another object is to produce chloro-N-dihydro-1:2:2':1'-anthraquinone azines which possess excellent physical properties and exhibit superior qualities of shade, brilliancy, light-fastness, bleach-fastness and tinctorial strength. A still more specific object is to prepare monochloro- and dichloro-N-dihydro-1:2:2':1'-anthraquinone azines and mixtures thereof which are characterized by improved dyeing and printing properties and greater purity than chlorinated N-dihydro-1:2:2':1'-anthraquinone azines resulting from the chlorination of N-dihydro-1:2:2':1'-anthraquinone azine with chlorine alone in sulfuric acid solution. Another object is to provide a new and improved process for producing products of the character above described. Other objects will appear hereinafter.

These objects are accomplished according to the present invention whereby halogenated compounds of the indanthrone series, such as chloro-N-dihydro-1:2:2':1'-anthraquinone azines, are produced by halogenating a compound of the indanthrone series in a solvent medium by means of a halogen and the corresponding hydrogen halide at pressures higher than atmospheric.

While the invention is susceptible to considerable variation and modification in the manner of its practical application, particularly as regards the character and proportions of the reactants, the temperature, pressures and exact method of procedure, the following examples, in which the parts are by weight, will illustrate some of the products falling within the invention and how they may be prepared.

Example I

Five hundred parts of N-dihydro-1:2:2':1'-anthraquinone azine were dissolved in 4000 parts of sulfuric acid (95% to 96%) at about 50° C. to 60° C. in a water-cooled pressure vessel fitted with an agitator and a suitable hopper for the addition of sodium chloride. When the N-dihydro-1:2:2':1'-anthraquinone azine was dissolved, the solution was cooled to about 25° C. to 30° C., and 100 parts of dry sodium chloride added through the hopper installed for that purpose. The hydrogen chloride generated by the reaction of the sodium chloride and sulfuric acid produced a pressure of about 40 to 50 pounds per square inch (gauge). The charge was agitated for two hours to saturate the sulfuric acid with hydrogen chloride. Sufficient chlorine was then added from a storage cylinder during a period of about 15 to 30 minutes to increase the total pressure to about 100 to 125 pounds per square inch (gauge). The product was then agitated at a temperature of about 25° C. to 30° C. until a test sample showed that a chlorine content of about 5% to 7% had been obtained.

The reaction mass was discharged into a tank containing about 8000 to 9000 parts of water, the resultant mixture diluted to 16,000 to 18,000 parts with water, and the precipitated dye separated by filtering and washing. The dye was obtained in an excellent state of purity and yielded dyeings and printings of excellent qualities.

Example II

To 5000 parts of sulfuric acid (94% to 95%), maintained at a temperature of about 50° C. to 60° C., there were added 500 parts of N-dihydro-1:2:2':1'-anthraquinone azine. When the N- dihydro-1:2:2':1'-anthraquinone azine had dissolved, the solution was cooled to about 25° C. to 30° C. and about 100 parts of dry sodium chloride added as described in Example I. The hydrogen chloride generated produced a pressure of about 40 to 50 pounds per square inch (gauge). The reaction mixture was agitated for two hours to saturate the solution with hydrogen chloride. Sufficient chlorine was then added from a storage cylinder during a period of about 15 to 30 minutes to increase the total pressure to 135 to 150 pounds per square inch (gauge). The reaction mixture was agitated at 25° C. to 30° C. until a test sample showed that the chlorine content of the product was about 13% to about 15%. The pressure was then released and the chlorine and hydrogen chloride displaced by blowing air through the charge. The reaction mass was discharged into a tank containing about 8000 to 9000 parts of water, diluted to 16,000 to 18,000 parts with water and the precipitated dye recovered by filtration. A blue dye in an excellent state of purity was obtained, being most probably 4:4'-dichloro-N-dihydro-1:2:2':1'-anthraquinone azine.

Instead of chlorinated derivatives of N-dihydro-1:2:2':1'-anthraquinone azine, brominated derivatives may be produced by using the stoichiometrical equivalent proportions of bromine and sodium bromide in the procedures of Examples I and II.

*Example III*

About 100 parts of N-dihydro-1:2:2':1'-anthraquinone azine were dissolved in about 1000 to 1500 parts of 95% to 98% sulfuric acid. While maintaining the temperature of the solution at about 70° C. to 90° C., the $H_2SO_4$ concentration of the solution was lowered by the addition of 50% to 60% sulfuric acid until the concentration of sulfuric acid was about 82.5% to 87.5%. The mixture was then cooled slowly to about 15° C. to 30° C. In this temperature range, the sulfate of the N-dihydro-1:2:2':1'-anthraquinone azine crystallized out in mahogany-colored plates. The crystals were filtered and washed with 75% to 85% sulfuric acid (in which the sulfate is slightly soluble) until the filtrate was clear. The residual crystals were then re-dissolved in 1000 to 1500 parts of 95% to 98% sulfuric acid and the solution treated with hydrogen chloride and chlorine as in Example I.

The sulfate of the N-dihydro-1:2:2':1'-anthraquinone azine may be prepared in a like manner and treated as in Example II with hydrogen chloride and chlorine or with hydrogen bromide and bromine. The halogenated derivatives produced are characterized by good physical properties and an excellent state of purity.

The invention is particularly advantageous in the treatment of the dihydro-azine or mixtures comprising substantially the dihydro-azine, since a pure blue product may be obtained directly whereas when the halogenation of the dihydroazine is effected with a halogen such as chlorine alone, the green or azhydrine form of the halogenated derivative is normally produced.

The products containing up to 15% chlorine are particularly valuable commercially. The chloro-N-dihydro-1:2:2':1'-anthraquinone azine containing 6% to 7% chlorine corresponds in shade with many of the known commercial products containing about 4% to 6% chlorine. The product containing 13.5% to 14.4% chlorine corresponds in shade to certain of the known commercial products containing about 11% to about 14% chlorine. It is well known that commercial products prepared by chlorinating with chlorine in organic liquids contain as high as 18% to 19% chlorine. However, if such a product is vatted and then oxidized and isolated, the resulting product contains only about 13% to 14% chlorine. It is probable that this excess chlorine is bound very loosely to the molecule and the effective color applied to the cloth contains only about 13% to 14% chlorine. The preferred products of the present invention are the monochloro-N-dihydro-1:2:2':1'-anthraquinone azine, the dichloro-N-dihydro-1:2:2':1'-anthraquinone azine and mixtures thereof, which may contain some unchlorinated N-dihydro-1:2:2':1'-anthraquinone azine.

The proportions and concentrations of solvent used to dissolve the indanthrone compound may vary within relatively wide limits in a manner well known in the art. In general, it is preferable to employ a sulfuric acid solution having a concentration of at least 85% and preferably within the range of about 95% to about 100% by weight $H_2SO_4$. The lower limit of concentration is generally determined by the minimum concentration which is required to dissolve the compound to be chlorinated. If desired, a more highly concentrated sulfuric acid solvent, such as weak oleum or any other inert solvent may be employed.

The hydrogen halide present during the halogenation may be formed or introduced into the reaction mixture in any suitable manner. Thus, as in Examples I and II, the hydrogen halide may be formed by the reaction of a halide with the sulfuric acid solution. In general, it is preferable to employ halides of metals which have soluble sulfates, more particularly the alkali metal halides, such as potassium chloride, sodium bromide, sodium chloride, potassium bromide, and the like. Alternatively, the hydrogen halide may be introduced into the reaction vessel as such, for example, directly from a pressure cylinder.

The proportions of hydrogen halide and halogen may vary within relatively wide limits. In general, desirable results have been obtained by saturating the sulfuric acid solution of the dye with the hydrogen halide. It is preferable that the amount of hydrogen halide correspond to at least one mole per mole of a given compound of the indanthrone series which is subjected to halogenation. The amount of halogen may be regulated according to the desired degree of halogenation.

In practice, the proportions of the hydrogen halide and gaseous halogen are preferably regulated by means of the pressure in the reaction vessel. Generally speaking, it has been found that very desirable results are obtained in the use of proportions of the hydrogen halide corresponding to a gauge pressure of about 25 to about 125 pounds per square inch, but it will be understood that concentrations of hydrogen halide corresponding to higher or lower pressures may be used. The proportions of halogen may vary within relatively wide limits depending largely upon the degree of halogenation desired. Good results have been obtained in the use of proportions of halogen corresponding to a total gauge pressure (including the pressure of the hydrogen halide) within the range of about 50 to about 250 pounds per square inch. In chlorinating with hydrogen chloride and chlorine, where it is desired to produce a monochloro-derivative, especially desirable results have been obtained in the use of an initial hydrogen chloride pressure of about 40 pounds per square inch (gauge) and a total pressure, including the hydrogen chloride and chlorine pressure, of about 125 pounds per square inch (gauge). Where it is desired to produce a dichloro-derivative, the proportions of hydrogen chloride should preferably correspond to a gauge pressure of about 45 to about 50 pounds per square inch and the proportions of chlorine should preferably be such that the total pressure is about 150 to about 155 pounds per square inch (gauge).

The temperatures employed in effecting the halogenation may vary widely, depending largely upon the results desired. In general, the temperature employed should be sufficiently high to enable the reaction to proceed smoothly, but insufficiently high to cause side reactions, as for example, sulfonation. Very desirable results have been obtained in carrying out the process at temperatures within the range of about 15° C. to about 100° C. A feature of the invention is that the halogenation may be effected entirely at relatively low temperatures, preferably about 25° C. to about 35° C., with good results whereas, according to the prior art, it is desirable to use relatively higher temperatures, for example, in the neighborhood of 50° C. to 60° C.

Although the halogenation reaction proceeds smoothly without a catalyst, if desired, catalysts may be employed. As examples of catalysts suitable for the reaction, iodine, ferrous sulfate, ferric sulfate, pyridine sulfate, and the like may be mentioned.

While the invention is not limited to any theory as regards the mechanism of the reaction, it appears that treating an N-dihydro-1:2:2':1'-anthraquinone azine with both a hydrogen halide and a halogen tends to prevent oxidation by the halogen. Apparently, the hydrogen halide reacts with the N-dihydro-1:2:2':1'-anthraquinone azine to form a hydrohalide, and it is this hydrohalide which then reacts with the free halogen. On the other hand, if the hydrogen halide is not introduced, the initial reaction of the halogen with the dihydro-azine probably removes the hydrogen atoms from the dihydro-azine group so that an oxidized form, such as, for example, the azine or azhydrine, is produced.

In any event, we have found that the products obtained by chlorinating N-dihydro-1:2:2':1'-anthraquinone azine in sulfuric acid solution with a mixture of chlorine and hydrogen chloride under super-atmospheric pressure are superior to products obtained by chlorinating under similar conditions with chlorine alone. Comparing the products on an equal chlorine content basis, the products obtained by chlorinating N-dihydro-1:2:2':1'-anthraquinone azine with chlorine alone are greener in shade, inferior in brilliancy and bleach-fastness, and weaker in tinctorial strength than are the products obtained by means of a chlorination with both chlorine and hydrogen chloride as herein described. Comparing the products on a similar shade basis, we have found that the products obtained according to the present invention contain a greater percentage of chlorine than products obtained by the chlorination with chlorine alone. This apparently confers a greater degree of bleach-fastness upon such products, and the qualities of superior brilliancy and tinctorial strength are maintained.

The over-all yields from the raw material to the finished dye paste are higher because of increased tinctorial strength according to the present invention, than where chlorine alone is used as a chlorinating agent. Over a considerable period an improvement of about 10% to 15% in total yields may be obtained. Furthermore, by the present process the reaction products are isolated in a more highly reduced state than where chlorine alone is used as a chlorinating agent.

The new products prepared in accordance with the process of the present invention are characterized by improved physical properties which render them more valuable for use in printing. According to a usual method of preparing a finished color, the dye is vatted, salted out, oxidized in a mixer and air-blown. Where a chloro-N-dihydro-1:2:2':1'-anthraquinone azine was prepared by chlorination with chlorine alone, it was necessary to limit the chlorine content to a maximum of about 3.5% to 4% in order to match the redness of shade of the standard color. Such a product is probably a mixture of chloro-N-dihydro-1:2:2':1'-anthraquinone azine and N-dihydro-1:2:2':1'-anthraquinone azine. During the mixer-oxidation step, the N-dihydro-1:2:2':1'-anthraquinone azine apparently becomes amorphous. In our experience, products of this type cause serious trouble in application as a printing paste due to coagulation in mixing the printing gum and the subsequent formation of specks on the prints. When using the new products prepared as herein described, we have found that it is possible to introduce about 6% to 7% of chlorine into N-dihydro-1:2:2':1'-anthraquinone azine without danger of making the product greener than the standard color. Such a product contains only a small proportion of unchlorinated N-dihydro-1:2:2':1'-anthraquinone azine and in the mixer-oxidation step, a finely crystalline product is obtained which mixes with the printing gum without specking and produces speck-free prints. Furthermore, these new pastes are considerably less viscous than the old type of products and possess superior working properties.

The new products of the present invention, on account of their improved physical form resulting in increased strength and brilliancy, have also been found to be particularly advantageous for use in coloring rubber.

As many apparently widely different embodiments of this invention may be made without departing from the spirit and scope thereof, it is to be understood that we do not limit ourselves to the specific embodiments thereof except as defined in the following claims.

We claim:

1. A process of producing a chloro-N-dihydro-1:2:2':1'-anthraquinone azine which comprises dissolving N-dihydro-1:2:2':1'-anthraquinone azine in sulfuric acid of about 95% to 100% concentration, introducing hydrogen chloride under super-atmospheric pressure of about 25 to about 125 pounds per square inch, while agitating the solution, then adding sufficient chlorine to increase the total pressure to about 50 to 250 pounds per square inch with agitation while maintaining the temperature of the reaction mixture within the range of about 15° C. to about 100° C., and recovering the chlorinated product by drowning in water.

2. A process of producing a dichloro-N-dihydro-1:2:2':1'-anthraquinone azine which comprises dissolving N-dihydro-1:2:2':1'-anthraquinone azine in sulphuric acid of about 94% to 95% concentration at about 50° C. to 60° C., cooling the resultant solution to about 25° C. to 30° C., adding sodium chloride in such amount that the hydrogen chloride formed is sufficient to saturate the solution under super-atmospheric pressure of about 25 to 125 pounds per square inch, then adding sufficient chlorine to increase the total pressure to about 135 to 150 pounds per square inch while maintaining a temperature of about 25° C. to 30° C., and agitating the reaction mixture until the chlorine content of the product is about 13% to 15%, releasing the pressure to atmospheric, passing air through the charge, introducing the reaction mass into a large volume of water, and recovering the precipitated dye.

3. A process of producing a dichloro-N-dihydro-1:2:2':1'-anthraquinone azine which comprises dissolving about 500 parts of N-dihydro-1:2:2':1'-anthraquinone azine in about 5000 parts of sulphuric acid of about 94% to about 95% concentration at about 50° C. to about 60° C., cooling the resultant solution to about 25° C. to about 30° C., adding about 100 parts of dry sodium chloride in a closed reaction vessel, agitating the mixture to saturate the solution with hydrogen chloride, then adding sufficient chlorine to increase the total pressure to about 135 to 150 pounds per square inch, while maintaining a temperature of about 25° C. to about 30° C., and agitating the reaction mixture until the chlorine content of the product is about 13% to about 15%, releasing the pressure to atmospheric, displacing the chlorine and hydrogen chloride by blowing air through the charge, introducing the reaction mass into about 8000 to 9000 parts of water, diluting to about 16,000 to 18,000 parts with water and recovering the precipitated dye.

4. In a process of producing chlorinated N-dihydro-1:2:2':1'-anthraquinone azines, the improvement which comprises treating a sulphuric acid solution of N-dihydro-1:2:2':1'-anthraquinone azine with chlorine under super-atmospheric pressure in the continuously maintained presence of at least one mole of added hydrogen chloride per mole of N-dihydro-1:2:2':1'-anthraquinone azine.

5. In a process of producing chlorinated N-dihydro-1:2:2':1'-anthraquinone azines, the improvement which comprises treating a sulphuric acid solution of N-dihydro-1:2:2':1'-anthraquinone azine with chlorine in the continuously maintained presence of a super-atmospheric pressure of added hydrogen chloride.

6. In a process of producing chlorinated N-dihydro-1:2:2':1'-anthraquinone azines, the improvement which comprises treating a sulphuric acid solution of N-dihydro-1:2:2':1'-anthraquinone azine with chlorine in the continuously maintained presence of a super-atmospheric pressure of added hydrogen chloride of at least 40 pounds per square inch.

7. In a process of producing chlorinated N-dihydro-1:2:2':1'-anthraquinone azines, the improvement which comprises treating a sulphuric acid solution of N-dihydro-1:2:2':1'-anthraquinone azine with chlorine under super-atmospheric pressure in the presence of a super-atmospheric pressure of added hydrogen chloride of at least 25 pounds per square inch, the total pressure of chlorine and hydrogen chloride being in excess of about 100 pounds per square inch.

FERDINAND W. PECK.
RAYMOND J. SOBATZKI.